(12) United States Patent
Roelver et al.

(10) Patent No.: US 12,442,872 B2
(45) Date of Patent: Oct. 14, 2025

(54) MAGNETIC FIELD GRADIOMETER

(71) Applicant: Q.ant GmbH, Stuttgart (DE)

(72) Inventors: Robert Roelver, Calw (DE); Stefan Hengesbach, Stuttgart (DE); Michael Foertsch, Ansbach (DE)

(73) Assignee: Q.ANT GMBH, Stuttgart (DE)

( * ) Notice: Subject to any disclaimer, the term of this patent is extended or adjusted under 35 U.S.C. 154(b) by 168 days.

(21) Appl. No.: 18/400,195

(22) Filed: Dec. 29, 2023

(65) Prior Publication Data

US 2024/0133979 A1 Apr. 25, 2024
US 2024/0230794 A9 Jul. 11, 2024

Related U.S. Application Data

(63) Continuation of application No. PCT/EP2022/065637, filed on Jun. 9, 2022.

(30) Foreign Application Priority Data

Jul. 2, 2021 (DE) ............... 10 2021 206 954.1

(51) Int. Cl.
*G01R 33/032* (2006.01)
*G01R 33/02* (2006.01)
*G01R 33/022* (2006.01)

(52) U.S. Cl.
CPC ....... *G01R 33/032* (2013.01); *G01R 33/0206* (2013.01); *G01R 33/022* (2013.01)

(58) Field of Classification Search
CPC .......... G01R 33/032; G01R 33/0206; G01R 33/022; G01R 33/0094; G01R 33/60; G01R 33/26; G01R 33/10
(Continued)

(56) References Cited

U.S. PATENT DOCUMENTS

| | | | | |
|---|---|---|---|---|
| 5,642,045 A | * | 6/1997 | Keefe | G01R 33/022 324/345 |
| 2002/0111762 A1 | * | 8/2002 | Harkins | G01C 17/38 702/151 |

(Continued)

FOREIGN PATENT DOCUMENTS

| | | |
|---|---|---|
| DE | 102019214684 A1 | 3/2021 |
| DE | 102019220353 A1 | 6/2021 |
| DE | 102021205679 A1 | 12/2022 |

OTHER PUBLICATIONS

Liu, Chu-Feng et al., "Ultra-sensitive hybrid diamond nanothermometer," National Science Review, May 2021, pp. 1-10, vol. 8, Issue 5, nwaa194, Oxford University Press, Oxford, United Kingdom.

(Continued)

*Primary Examiner* — Christopher P Mcandrew
(74) *Attorney, Agent, or Firm* — LEYDIG, VOIT & MAYER, LTD.

(57) ABSTRACT

A magnetic field gradiometer for determining a magnetic field gradient includes at least one excitation light source for emitting excitation light, and two spatially spaced-apart measuring areas for magnetic field measurement. Color centers in diamond are arranged in the two measuring areas. The color centers emit fluorescent light upon excitation using the excitation light. The magnetic field gradiometer further includes at least one microwave emitter for applying at least one microwave field to the spatially spaced-apart measuring areas, two detectors for detecting the fluorescent light from the two spatially spaced-apart measuring areas, and an evaluator for determining the magnetic field gradient based on the fluorescent light detected by the two detectors. The two measuring areas are configured as freestanding measuring waveguides of a common diamond crystal. The (Continued)

diamond crystal is used as a substrate for the measuring waveguides.

18 Claims, 4 Drawing Sheets

(58) Field of Classification Search
USPC .................................................. 324/244.1
See application file for complete search history.

(56) References Cited

U.S. PATENT DOCUMENTS

| | | | | |
|---|---|---|---|---|
| 2010/0079908 | A1* | 4/2010 | Heidmann | G11B 5/455 360/110 |
| 2017/0328965 | A1* | 11/2017 | Hruby | G01R 33/26 |
| 2019/0391213 | A1* | 12/2019 | Alford | G01R 33/0094 |
| 2021/0247468 | A1* | 8/2021 | Shapiro | G01R 33/56581 |
| 2022/0212284 | A1 | 7/2022 | Foertsch et al. | |

OTHER PUBLICATIONS

Dory, Constantin, et al., "Inverse-designed diamond photonics," Nature communications 10, Jul. 25, 2019, pp. 1-8, No. 1, Article No. 3309, Springer Nature, Berlin, Germany.

Balasubramanian, Gopalakrishnan, et al., "Nanoscale imaging magnetometry with diamond spins under ambient conditions," Nature, Oct. 2, 2008, pp. 648-651, vol. 455, Macmillan Publishers Limited, New York, USA.

Limes, M.E et al., "Portable magnetometry for detection of biomagnetism in ambient environments," Physical Review Applied, Jun. 2, 2020, pp. 1-10, vol. 14, Issue 1, American Physical Society, MD, USA.

Stürner, F.M., et al., "Integrated and Portable Magnetometer Based on Nitrogen-Vacancy Ensembles in Diamond," Advanced Quantum Technologies, Feb. 10, 2021, pp. 1-10, vol. 4, Issue 4, Wiley Online Library, NJ, USA.

I. Bello et al., "Effects at reactive ion etching of CVD diamond," Thin Solid Films, Jun. 15, 2000, pp. 222-226, vol. 368, Issue 2, Elsevier, Amsterdam, Netherlands.

Nagai, Masatsugu et al., "Anisotropic diamond etching through thermochemical reaction between Ni and diamond in high-temperature water vapour," Scientific reports, Apr. 27, 2018, pp. 1-8, vol. 8, Issue 6687, Springer Nature, Berlin, Germany.

Masuyama Yuta et al., "Gradiometer using separated diamond quantum magnetometers," Sensors, 2021, No. 3: 977, pp. 1-11, MDPI, Basel, Switzerland.

Blakley S. M. et al., "Room-temperature magnetic gradiometry with fiber-coupled nitrogen-vacancy centers in diamond," Optics Letters, 2015, pp. 3727-3730, vol. 40, No. 16, Optical Society of America, Washington, D.C., United States.

S. M. Blakley et al., "Fiber-optic vectorial magnetic-field gradiometry by a spatiotemporal differential optical detection of magnetic resonance in nitrogen-vacancy centers in diamond," Optics Letters, 2016, pp. 2057-2060, vol. 41, Issue 9, Optical Society of America, Washington, D.C., United States.

Hausmann BJ et al., "Coupling of NV centers to photonic crystal nanobeams in diamond," Nano letters, 2013, pp. 5791-5796, vol. 13, Issue 12, American Chemical Society, Washington, D.C., United States.

Alexander Landowski et al., "Coherent Remote Control over Nano-Emitters Embedded in Polymer Waveguides," arXiv, Nov. 2018, pp. 1-7, v1, Cornell University Library, Ithaca, New York, United States.

* cited by examiner

MAGNETIC FIELD GRADIOMETER

CROSS REFERENCE TO RELATED APPLICATIONS

This application is a continuation of International Application No. PCT/EP2022/065637 (WO 2023/274676 A1), filed on Jun. 9, 2022, and claims benefit to German Patent Application No. DE 10 2021 206 954.1, filed on Jul. 2, 2021. The aforementioned applications are hereby incorporated by reference herein.

FIELD

Embodiments of the present invention relate to a magnetic field gradiometer for determining a magnetic field gradient. Embodiments of the present invention also relate to a magnetic field gradiometer array, a three-dimensional magnetic field gradiometer array, and an integrated optical circuit.

BACKGROUND

Magnetic field gradiometers are used for determining magnetic field gradients, thus the quotient of the change of the magnetic field over a given spatial distance, in particular for determining small and ultrasmall magnetic field gradients. A magnetic field gradiometer typically comprises two magnetometers, via each of which the magnetic field is measured and which are arranged at a defined spatial distance from one another. In comparison to magnetic field measurement by means of a single magnetometer, the use of magnetic field gradiometers is often advantageous since ambient noise which acts identically on both magnetometers, in particular interference signals of very remote magnetic field sources, is eliminated thereby. Magnetic field gradiometers find practical use, for example, in magnetocardiography and the indirect measurement of brain currents in magnetoencephalography.

Magnetic field gradiometers of the type described at the outset and corresponding magnetometers are based on a magnetic field-dependent change of the fluorescence of color centers in diamond or of NV centers in the presence of an alternating magnetic field. More precisely, this involves optical detection of magnetic resonance (ODMR). The basic principles are described in the article "Nanoscale imaging magnetometry with diamond spins under ambient conditions" by G. Balasubramian et al., Nature 455, 648 (2008). The principle will be explained in summary hereinafter on the basis of the example of an NV center.

An NV center is a special color center in diamond which consists of a nitrogen atom and an adjacent vacancy. More precisely, an NV center is understood in the scope of this application as a negatively charged NV center. The magnetic field gradiometers are furthermore designed for measuring at a large number of NV centers (so-called ensemble magnetometry).

The energy levels of an NV center comprise a ground state and an excited state in the form of a triplet in each case. The respective three states of each triplet differ in their magnetic spin quantum number, $m_S=-1, 0, +1$. The $m_S=\pm 1$ states are higher energy due to the spin-spin interaction than the $m_S=0$ state. Without magnetic field, the $m_S=\pm 1$ states are degenerate (if the hyperfine structure is neglected), thus have the same energy. In the presence of a magnetic field, in contrast, the degeneracy of the $m_S=\pm 1$ states is canceled out proportionally to the magnetic field due to the Zeeman effect.

The NV centers can be pumped out of the ground state into the excited state by means of radiating in excitation light in the green wavelength range. The return into the ground state partially takes place with the emission of red fluorescent light. The intensity of this fluorescent light is dependent on the population distribution between the $m_S=-1, 0, +1$ states of the triplet ground state. This population distribution can be influenced by interaction with a resonant microwave field. More precisely, in a microwave field having the frequencies $f_+$ and $f_-$, corresponding to the transitions between the $m_S=0$ and the $m_S=+1$ state or the $m_S=-1$ state, a drop of the detected intensity of the fluorescent light occurs.

The frequencies $f_+$ and $f_-$ result here from the formula $$f_\pm \approx D_{gs} + \beta \cdot \Delta T \pm \gamma_{NV} B_0,$$

see, for example, the article "Integrated and portable magnetometer based on nitrogen-vacancy ensembles in diamond" by F. Stürner et al., arXiv:2012.01053. In this case, $D_{gs} \approx 2.87$ GHz is the split between the $m_S=0$ state and the $m_S=\pm 1$ states of the triplet ground state at room temperature in the absence of a magnetic field, $\beta \approx -75.0$ kHz K$^{-1}$ is the temperature dependence of this split, $\Delta T$ is the deviation from room temperature, $\gamma_{NV}$ is the gyromagnetic ratio of the NV center, and $B_0$ is the projection of the magnetic field on the corresponding axis of the NV center.

The frequency of the microwave field is now varied to determine a magnetic field by means of a corresponding magnetometer. Depending on the frequency of the microwave field, the measured intensity of the fluorescent light has minima, also called a "dip" or "dips", at the frequencies $f_\pm$. The magnetic field is determined via the location of these minima on the basis of the mentioned formula.

In the case of a magnetic field gradiometer, such measurements take place in two spatially spaced-apart measuring areas, in each of which NV centers or other diamond color centers are arranged. The magnetic field gradient is then determined from a comparison of the minima of the fluorescent light from the first and the second measuring area and the distance of the measuring areas.

A magnetometer based on NV centers in diamond is described in the cited article by F. Stürner et al. A diamond crystal having NV centers is connected via a lens to an optical fiber. The NV centers are optically excited by means of a fiber-bound laser module at a wavelength of 521.9 nm. Fluorescent light emitted by the NV centers is detected by means of a silicon photodiode, which is arranged on the side of the diamond crystal opposite to the lens and the fiber. A double split-ring resonator is used to provide an alternating magnetic field in the microwave range.

Furthermore, in the article "Portable magnetometry for detection of biomagnetism in ambient environments" by M. Limes et al., Phys. Rev. Appl. 14, 011002, a magnetic field gradiometer based on two spatially spaced-apart Rb vapor cells is described. The measurement is carried out via pulsed laser beams in a so-called pump probe scheme. The Rb atoms in the vapor cells are initially spin-polarized by means of a pump beam. The magnetic field-dependent Larmor frequency of the Rb atoms is then determined for both vapor cells by means of a probe beam. The magnetic field gradient is then determined from the difference of the Larmor frequencies and the distance of the vapor cells.

A magnetic field gradiometer based on two spatially separated diamond quantum magnetometers is described in the article "Gradiometer Using Separated Diamond Quantum Magnetometers" by Y. Masuyama et al., Sensors 21, 977 (2021). An optical fiber is attached to each of two diamonds having NV centers. The diamonds are illuminated using a laser beam via the optical fibers. An antenna in the form of a coplanar line is used in each case to apply a microwave field to the diamonds. Fluorescent light emitted by the NV centers reaches a photodetector in each case via the optical fibers. The magnetic field gradient is then determined from the fluorescence signals. Furthermore, a magnet is used to provide a bias magnetic field.

However, a temperature difference can easily occur between the two magnetometers or the two measuring areas due to the design of such magnetic field gradiometers. Such a temperature difference can distort the determined magnetic field gradient due to the temperature dependence of the frequencies $f_\pm$. Furthermore, such magnetic field gradiometers require a relatively large amount of installation space.

SUMMARY

Embodiments of the present invention provide a magnetic field gradiometer for determining a magnetic field gradient. The magnetic field gradiometer includes at least one excitation light source for emitting excitation light, and two spatially spaced-apart measuring areas for magnetic field measurement. Color centers in diamond are arranged in the two measuring areas. The color centers emit fluorescent light upon excitation using the excitation light. The magnetic field gradiometer further includes at least one microwave emitter for applying at least one microwave field to the spatially spaced-apart measuring areas, two detectors for detecting the fluorescent light from the two spatially spaced-apart measuring areas, and an evaluator for determining the magnetic field gradient based on the fluorescent light detected by the two detectors. The two measuring areas are configured as freestanding measuring waveguides of a common diamond crystal. The diamond crystal is used as a substrate for the measuring waveguides.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
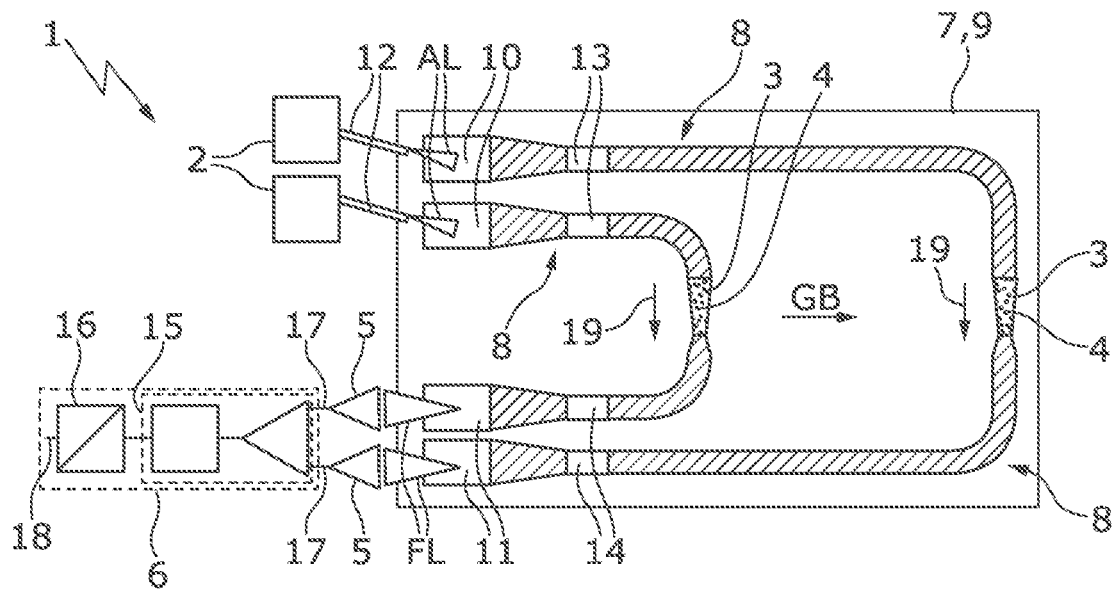
FIG. 1 shows a schematic representation of a magnetic field gradiometer comprising two measuring areas, in which NV centers are arranged, wherein the measuring areas are designed as measuring waveguides of a common diamond crystal, according to some embodiments.

Embodiments of the invention provide a magnetic field gradiometer that has a compact design and is insensitive to external interfering influences, in particular temperature influences.

According to a first aspect, a magnetic field gradiometer for determining a magnetic field gradient includes at least one excitation light source for emitting excitation light, two spatially spaced-apart measuring areas for magnetic field measurement, in which color centers in diamond, preferably NV centers, are arranged, which emit fluorescent light upon excitation using the excitation light, at least one microwave emitter for applying at least one microwave field to the spatially spaced-apart measuring areas, two detectors for detecting the fluorescent light from the two spatially spaced-apart measuring areas, and an evaluation device for determining the magnetic field gradient on the basis of the fluorescent light detected by the detectors. The measuring areas are designed as preferably freestanding measuring waveguides of a common diamond crystal, which is used as the substrate for the measuring waveguides.

The measuring waveguides are optical waveguides which are formed from the material of the diamond crystal, typically freestanding optical waveguides which are formed during three-dimensional structuring of the diamond crystal. The diamond crystal has color centers in the area of the measuring waveguides, in particular it is doped with color centers in this area. Color centers, in particular NV centers, are thus present inside the measuring waveguides. The distance between the measuring waveguides is preferably between 5 mm and 5 cm, preferably approximately 2 cm. Details on waveguides made of diamond are found, for example, in the article "Inverse-designed diamond photonics" by C. Dory et al., Nat. Commun. 10, 3309 (2019). Diamond waveguides having color centers for use in quantum communication and quantum computing are also discussed therein.

The magnetic field gradiometer can also have more than two measuring waveguides and accordingly more than two detectors. In this case, the magnetic field gradiometer is suitable, for example, for detecting higher-order magnetic field gradients.

The measuring waveguides are preferably manufactured subtractively from the diamond crystal. For example, reactive ion etching, see the article "Effects at reactive ion etching of CVD diamond" by I. Bello et al., Thin Solid Films 368, 222 (2000), direct writing laser structuring methods or nickel-induced etching methods, see the article "Anisotropic diamond etching through thermochemical reaction between Ni and diamond in high-temperature water vapour" by M. Nagai et al., Sci. Rep. 8, 6687 (2018) come into consideration as corresponding production methods. In the case of a direct writing laser structuring method, for example, an ultrashort pulse laser having a wavelength in the UV wavelength range can be used in order to inscribe waveguides in the diamond crystal, as described, for example, in DE 10 2019 214 684 A1. To improve the precision in direct writing laser structuring, it is favorable if the diamond crystal is heated during the laser structuring to a temperature of more than 600° C. and not more than 1000° C., as described in DE 10 2021 205 679.2.

The waveguides created by the laser structuring can be underetched for the formation of the freestanding measuring waveguides. For the underetching, initially a masking layer can be deposited on the structured surface on which the waveguides are formed, which masking layer is at least partially removed in the area of the side walls of a respective waveguide, more precisely at the base of a trench formed there. In the area in which the masking layer was removed, a respective trench can be deepened, by which a section is formed on the side wall which is not covered by the masking layer. Starting from this section, the measuring waveguide can be underetched using an isotropic etching process in order to form the freestanding measuring waveguide. The isotropic etching process can be carried out, for example, in the form of thermal oxidation at a temperature between approximately 600° C. and 1100° C. in an oxygen-containing atmosphere.

The measuring waveguides are manufactured from a common diamond crystal. As a result, there are no concentration differences or, in comparison to the implementation using two separate diamonds, significantly smaller concentration differences of the color or NV centers between the measuring waveguides. Furthermore, a high level of integration and thus a compact design is achieved in this way.

The diamond crystal or, in the case of the subtractive manufacturing of the measuring waveguides, the remaining part of the diamond crystal, is additionally used as a substrate for the measuring waveguides. Therefore, temperature differences between the two measuring waveguides are equalized effectively and quickly by the high thermal conductivity of diamond. As a result, the magnetic field gradiometer is insensitive to external temperature influences. Disadvantageous effects of different degrees of tension are also avoided. As a result, a more accurate determination of magnetic field gradients is thus possible.

In contrast, if the measuring areas are designed in the form of two separate diamond crystals, this results in an array of disadvantages, among other things due to thermal and mechanical influences and different crystal qualities. The required installation space is typically greater and effective noise suppression is significantly more difficult, since actual balanced evaluation is not possible.

Excitation light introduced on one side into the measuring waveguides results in an excitation of the color centers, in particular the NV centers. The wavelength of the excitation light is preferably between 510 nm and 550 nm, preferably 532 nm. The excitation power is preferably between 10 mW and 500 mW, preferably between 20 mW and 100 mW. The excitation light source can be a diode laser, for example. As a result of the excitation, the color centers emit florescent light. The florescent light typically has a wavelength in the red spectral range, in particular in the case of NV centers.

The detectors are, for example, photodiodes. The quantum efficiency of the detectors for red fluorescent light is preferably at least 80%. Each one of the detectors is arranged so that the fluorescent light from one of the measuring waveguides is detected thereby in each case.

The evaluation unit is preferably designed for balanced evaluation of the fluorescent light detected by the detectors. For this purpose, both detector signals are first subtracted from one another and only the differential signal is amplified and converted via an analog-to-digital converter into a digital signal. This signal thus only contains the difference of the fluorescence signal, induced by the magnetic field gradient, from the two measuring waveguides. For the case in which only one excitation light source is provided, the excitation light of which is coupled via an incoupling device into the diamond crystal or a further waveguide structure and is distributed onto the two measuring waveguides (see below), the influence of the laser intensity noise is minimized by this measure at the same time.

In one embodiment, further waveguide structures are manufactured from the diamond crystal or it has further waveguide structures which are used to feed the excitation light into the measuring waveguides and to discharge the florescent light from the measuring waveguides, wherein the diamond crystal is not doped with color centers, and is preferably not doped with NV centers, in the area of the further waveguide structures. The further waveguide structures can also be used for further purposes in addition to feeding the excitation light and discharging the fluorescent light. For example, the further waveguide structures can have coupling elements, filters, and/or splitters.

Due to the embodiment of the measuring areas as measuring waveguides and the feed of the excitation light and the discharge of the fluorescent light via the further waveguide structures, on the one hand, less excitation light power is necessary. The requirements for the excitation light source are accordingly less. On the other hand, a higher collection efficiency of the fluorescent light is thus achieved, since it is guided within the measuring waveguides or the further waveguide structures and outcoupled directly at the detectors. As a result, the sensor sensitivity is increased.

Since, as described hereinafter, the "active" volume having color centers is to be optimized and is not to be excessively large due to the absorption of the excitation light, it is advantageous if the diamond crystal is only doped in the area of the measuring waveguides and not in the area of the further waveguide structures. It is furthermore advantageous if the further waveguide structures not only have no color centers, but also no other absorbing impurities. The waveguide loss is preferably less than 1 dB/cm.

To achieve spatially bounded doping, on the one hand, this can take place after the production of the diamond crystal, typically by means of ion implantation and subsequent activation of the NV centers via annealing and electron bombardment. This subsequent doping has the disadvantage that additional process steps are necessary, such as the application of implantation masks and the subsequent activation of the implanted nitrogen ions to form NV centers. Furthermore, the diamond crystal lattice is damaged by ion implantation, which results in an increase of the achievable magnetic resonance line width and thus a reduced magnetic field sensitivity.

In one refinement of this embodiment, the diamond crystal comprises at least one first layer and at least one second layer, wherein the diamond crystal is doped with the color centers, preferably with the NV centers in the first layer and the measuring waveguides are arranged in the first layer, and wherein the second layer is not doped with the color centers, preferably is not doped with the NV centers, wherein the further waveguide structures are arranged in the second layer. In such an arrangement of the measuring waveguides and the further waveguide structures, the doping of the diamond crystal preferably takes place during its crystal growth. The mentioned disadvantages of subsequent doping are avoided. Furthermore, the production expenditure is lower.

The diamond crystal can be produced, for example, via chemical vapor deposition (CVD). To achieve the doping in the at least one first layer, but not in the at least one second layer, for example, doping gas can be deliberately turned on and off during the CVD growth process. After the production of the diamond crystal, the measuring waveguides and the further waveguide structures are structured from this coated diamond crystal, for example via direct writing laser ablation methods. The fact is utilized here that arbitrary 3D structures can be produced from the diamond crystal by the ablation in combination with an isotropic etching method on the diamond surface. The laser ablation can be carried out, for example, by means of a UV femtosecond laser.

The first layer preferably lies above or below the second layer. "Above" and "below" relate here to the processing direction of the diamond crystal during the manufacturing of the measuring waveguides and the further waveguide structures. If the first layer lies above the second layer and thus the measuring waveguides lie above the further waveguide structures, the "active" areas, thus the measuring waveguides, will thus possibly be damaged less by laser action. If the second layer lies above the first layer and thus the further waveguide structures lie above the measuring waveguides, overall much less material removal is thus necessary in the entire specimen.

In a further embodiment, the further waveguide structures have at least one incoupling device for coupling in the excitation light and/or at least two outcoupling devices for outcoupling the fluorescent light, wherein the at least one incoupling device and/or the at least two outcoupling devices are preferably grating couplers or facets. One of the two detectors is located in each case behind each of the two outcoupling devices. In the case of an incoupling device in the form of a facet, it is preferably provided with an antireflection coating or an index matching material or an immersion liquid is preferably introduced between the fiber output of an optical fiber which is used to feed the excitation light and the facet. This is used to avoid reflections, which are in particular a result of the high index of refraction of diamond. Coupling losses can also be minimized in the outcoupling devices, for example, by using an index matching material or an immersion liquid. If the incoupling device is a grating coupler, it is preferably optimized to the wavelength of the excitation light, in particular to a wavelength of 532 nm. If the outcoupling device is a grating coupling, it is preferably optimized to the wavelength of the fluorescent light. The coupling losses upon incoupling or upon outcoupling are preferably less than 20%.

In a further embodiment, the further waveguide structures each have a short-pass filter, which transmits the excitation light and reflects the fluorescent light, in the beam path before the two measuring waveguides. The fluorescent light has a longer wavelength than the pump light or excitation light. The fluorescent light can thus be reflected by means of a suitable short-pass filter, while the excitation light is transmitted. The fluorescent light emitted by the color centers initially propagates anisotropically, thus not only in the direction of the detector but also in the direction of the excitation light source. To increase the collection efficiency of the fluorescent light, it is therefore advantageous to arrange a short-pass filter in each case in the beam path before the two measuring waveguides, which reflects the fluorescent light not emitted in the direction of the detector back in the direction of the detector. The reflectance of the short-pass filter for the fluorescent light, in particular at a typical fluorescent light wavelength of 650 nm, is preferably at least 90%, while the transmittance for the excitation light is preferably at least 95%.

In a further embodiment, the further waveguide structures each have a long-pass filter, which reflects the excitation light and transmits the fluorescent light, in the beam path after the two measuring waveguides. The typically green excitation light is reflected back and only the typically red fluorescent light is transmitted in the direction of the detectors by the long-pass filter. The reflectance of the short-pass filter for the excitation light is preferably greater than 99.9%, preferably 99.999%, while the transmittance for the florescent light is preferably at least 95%.

The short-pass filters and also the long-pass filters can be implemented, for example, on the basis of photonic crystals or as gratings structured in the further waveguide structures.

In a further embodiment, the cross section of the measuring waveguides decreases in the propagation direction of the excitation light, wherein the geometry of the measuring waveguides preferably corresponds to a truncated pyramid, in particular having a square footprint.

Since the sensitivity of the magnetic field gradiometer and correspondingly constructed magnetometer is dependent, among other things, on the power of the excitation light and on the intensity of the collected fluorescent light, the measuring waveguides are to have a quality in their geometry such that, on the one hand, sufficient fluorescent light is generated (determined by the number of color centers, in particular NV centers, which are excited in the measuring waveguides) and can be collected by the detectors, and, on the other hand, each color center, in particular each NV center, in the measuring waveguides is excited as much as possible by the same excitation light intensity. Such a constant optical excitation density can be achieved along the measuring waveguides by the tapering of the measuring waveguides, thus a "tapered" shape. For this purpose, it is necessary to select the cross section of the measuring waveguide suitably in dependence on the position in the longitudinal direction of the measuring waveguide.

In a further embodiment, the further waveguide structures have a beam splitter for splitting the excitation light onto two waveguide arms, wherein one of the measuring waveguides is arranged in each of the waveguide arms. The beam splitter is preferably a 50:50 beam splitter. The magnetic field gradiometer manages with only one excitation light source and one incoupling device due to the splitting of the excitation light. The influence of the laser intensity noise or the noise which arises upon incoupling (for example due to mechanical vibrations or thermal effects) is reduced by such a use of only one excitation light source and/or only one incoupling device for feeding the excitation light into both measuring waveguides.

In an alternative embodiment, the further waveguide structures have a beam splitter for splitting the excitation light onto three waveguide arms, wherein one of the measuring waveguides is arranged in each case in two of the waveguide arms and a third detector is used for detecting the excitation light from the third waveguide arm. The third waveguide arm has no color centers or NV centers, but rather is used only to provide a laser reference signal, with the aid of which additional balancing of the gradiometers signal can take place. Alternatively, such a laser reference signal can also be obtained by means of a detector, for example by means of a photodiode, which is integrated in the laser source.

In a further embodiment, the magnetic field gradiometer comprises a magnetic field source for applying a bias magnetic field to the measuring waveguides, which preferably has the same direction and the same absolute value in both measuring waveguides. The bias magnetic field is used in particular to split the resonances of the four possible NV directions in diamond. This enables a magnetic field vector measurement. The magnetic field source is, for example, a current-conducting Helmholtz coil pair, the axis of which is preferably parallel to, preferably identical to the connecting axis of the two measuring waveguides. However, the magnetic field source can also be a permanent magnet arrangement, for example a Halbach array.

The microwave emitter can be, for example, a resonator or an antenna. The Q factor is preferably greater than 20. In one possible arrangement, a microwave emitter is located in each case in the area of each of the measuring waveguides. The frequency range of the microwave emitter is preferably between 2.8 GHz and 3.1 GHz.

The microwave source can preferably be modulated to improve the signal-to-noise ratio of the magnetic field gradiometer. The microwave signal is modulated in this case at a specific modulation frequency and a specific modulation depth and the output signal of the magnetic field gradiometer is demodulated at the same frequency. Depending on the magnetic field gradient to be expected, the modulation depth is to be adapted so that it is not wider than the resonance shift to be expected. On the other hand, it is to be below the resonance line width. If the magnetic field gradient to be expected is significantly higher than the resonance line width, both measuring waveguides can be subjected to different microwave fields.

In a further embodiment, the at least one microwave emitter is at least one split-ring resonator.

The microwave field can also be generated by means of a suitable application-specific integrated circuit, typically referred to as an ASIC. The microwave field can be applied to the measuring areas of a diamond crystal arranged directly on the ASIC via corresponding metallization levels and structures in the ASIC. In such a highly integrated solution, it is reasonable for the ASIC to also contain the detectors and the evaluation unit at the same time, typically in the form of an evaluation electronic unit which is possibly designed for balanced detection. In this case, the location of the outcoupling devices can be matched to the position of the detectors on the ASIC.

In a further embodiment, the concentration of the color centers, preferably of the NV centers, in the measuring waveguides is between 0.1 ppm and 2 ppm, preferably between 0.3 ppm and 0.7 ppm, preferably 0.5 ppm. The lower value of 0.1 ppm results because as much fluorescent light as possible is to be generated to achieve high sensitivities, and the upper value of 2 ppm results because at concentrations of greater than 2 ppm, a line widening of the magnetic resonance occurs due to overlap of the electron wave functions of individual adjacent color centers.

The object mentioned at the outset is achieved according to a further aspect by a magnetic field gradiometer array, comprising a plurality of magnetic field gradiometers which are designed as described above and are arranged along an axis or in a plane, wherein the measuring waveguides of the magnetic field gradiometers are preferably manufactured from a common diamond crystal, which is used as the substrate for the measuring waveguides. The further waveguide structures of the magnetic field gradiometer are preferably also manufactured from the same diamond crystal. The arrangement along an axis enables, for example, a greater measuring range and a distance determination to the magnetic field source. The arrangement in a plane enables two-dimensional magnetic field mapping. The magnetic field gradiometer array can have a plurality of excitation light sources or only one common excitation light source.

The object mentioned at the outset is achieved according to a further aspect by a three-dimensional magnetic field gradiometer array, comprising a plurality of stacked magnetic field gradiometer arrays which are designed as described above. Gradiometric 3D mapping is possible using such a three-dimensional magnetic field gradiometer array. Magnetic field sources can be localized in all three spatial directions, which can be used, for example, to implement a magnetoencephalography-based brain-computer interface.

The object mentioned at the outset is achieved according to a further aspect by an integrated optical circuit for use in a magnetic field gradiometer, in particular in a magnetic field gradiometer as described above, comprising two spatially spaced-apart measuring areas for magnetic field measurement, which are designed in the form of preferably freestanding measuring waveguides of a common diamond crystal, which is used as the substrate for the measuring waveguides and is doped with color centers, preferably with NV centers, in the area of the measuring waveguides. Reference is made to the above statements on the magnetic field gradiometer and the corresponding embodiments with respect to the advantages of the integrated optical circuit and its embodiments described hereinafter.

In one embodiment, the diamond crystal has further waveguide structures, which are used to feed the excitation light into the measuring waveguides and to discharge the florescent light from the measuring waveguides, wherein the diamond crystal is preferably not doped with color centers, preferably not doped with NV centers, in the area of the further waveguide structures.

In one refinement of this embodiment, the diamond crystal comprises at least one first layer and at least one second layer, wherein the diamond crystal is doped with the color centers, preferably with the NV centers in the first layer and the measuring waveguides are arranged in the first layer, and wherein the second layer is not doped with the color centers, preferably is not doped with the NV centers, wherein the further waveguide structures are arranged in the second layer.

In a further embodiment, the cross section of the measuring waveguides decreases in the propagation direction of the excitation light, wherein the geometry of the measuring waveguides preferably corresponds to a truncated pyramid, in particular having a square footprint.

Further advantages of the invention result from the drawing and its following description. Likewise, the features mentioned above and those that are yet to be presented may be used in each case by themselves or as a plurality in any desired combinations. The embodiments shown and described should not be understood as an exhaustive enumeration, but rather are of an exemplary character for outlining the invention.

In the following description of the drawing, identical reference signs are used for identical or corresponding components.

FIG. 1 shows an example of a magnetic field gradiometer 1 for determining a magnetic field gradient GB having two excitation light sources 2 for emitting excitation light AL, two spatially spaced-apart measuring areas 3 for magnetic field measurement, in which NV centers 4 are arranged which emit fluorescent light FL upon an excitation using the excitation light AL, two detectors 5 for detecting the fluorescent light FL from the two measuring areas 3, and an evaluation device 6 for determining the magnetic field gradient GB on the basis of the fluorescent light FL detected by the detectors 5. The measuring areas are manufactured as measuring waveguides 3 from a common diamond crystal 7, which is used as the substrate for the measuring waveguides 3. The detectors 5 shown are photodiodes, but they can also be other detectors.

The magnetic field gradiometer 1 additionally comprises a microwave emitter (not shown in FIG. 1) for applying a microwave field to the spatially spaced-apart measuring areas 3.

In addition, further waveguide structures 8 are manufactured from the diamond crystal 7, which are used to feed the excitation light AL into the measuring waveguides 3 and to discharge the fluorescent light FL from the measuring waveguides 3. The measuring waveguides 3 and further waveguide structures 8 can be understood together with the diamond crystal 7 as an integrated optical circuit 9. The diamond crystal 7 is not doped with NV centers 4 in the area of the further waveguide structures 8.

The concentration of the NV centers 4 in the measuring waveguides 3 is 0.5 ppm, in general, it can also be between 0.1 ppm and 2 ppm or between 0.3 ppm and 0.7 ppm, however. Instead of the NV centers 4, other color centers can also be arranged in the measuring waveguides 3. In this case, the diamond crystal 7 is preferably not doped with the corresponding color centers in the area of the further waveguide structures 8. The integrated optical circuit 9 does not necessarily have to have further waveguide structures.

The further waveguide structures 8, which are designed in the example shown as ridge waveguides, have two incoupling devices 10 and two outcoupling devices 11 each in the form of grating couplers. The two detectors 5 are arranged in the example shown directly behind the outcoupling devices 11. Two optical fibers 12 are used here, for example, to feed the excitation light AL from the excitation light sources 2 to the incoupling devices 10. However, the incoupling and/or outcoupling devices 10, 11 can also be designed in another manner, for example as facets of the further waveguide structures 8.

The further waveguide structures 8 each have a short-pass filter 13 in the beam path before the two measuring waveguides 3 and each have a long-pass filter 14 in the beam path after the two measuring waveguides 3. The short-pass filters 13 transmit the excitation light AL and reflect the fluorescent light FL propagating in the direction of the excitation light sources 2. The long-pass filters 14 reflect the excitation light AL and transmit the fluorescent light FL. The short-pass and long-pass filters 13, 14 are integrated in the case shown as gratings in the further waveguide structures 8, but in general can also be implemented differently. In contrast to the illustration here, the further waveguide structures 8 also do not have to have short-pass filters 13 and/or long-pass filters 14.

The evaluation device 6 is designed for the balanced evaluation of the fluorescent light FL detected by the detectors 5 and comprises a differential amplifier 15 and an analog-to-digital converter 16. The detector signals 17 are initially subtracted from one another in the differential amplifier 15. The differential signal is then amplified and converted via the analog-to-digital converter 16 into a digital signal 18. The evaluation device 6 can also be designed differently than the illustration in FIG. 1, however.

In FIG. 1, the cross section of the measuring waveguides 3 additionally decreases in the propagation direction 19 of the excitation light AL. The decrease of the cross section of the measuring waveguides 3 in the propagation direction 19 of the excitation light AL is defined so that a constant optical excitation density is provided along the measuring waveguides 3. In general, the cross section of the measuring waveguides 3 does not necessarily have to be reduced in the propagation direction 19 of the excitation light AL.

Figure 2:
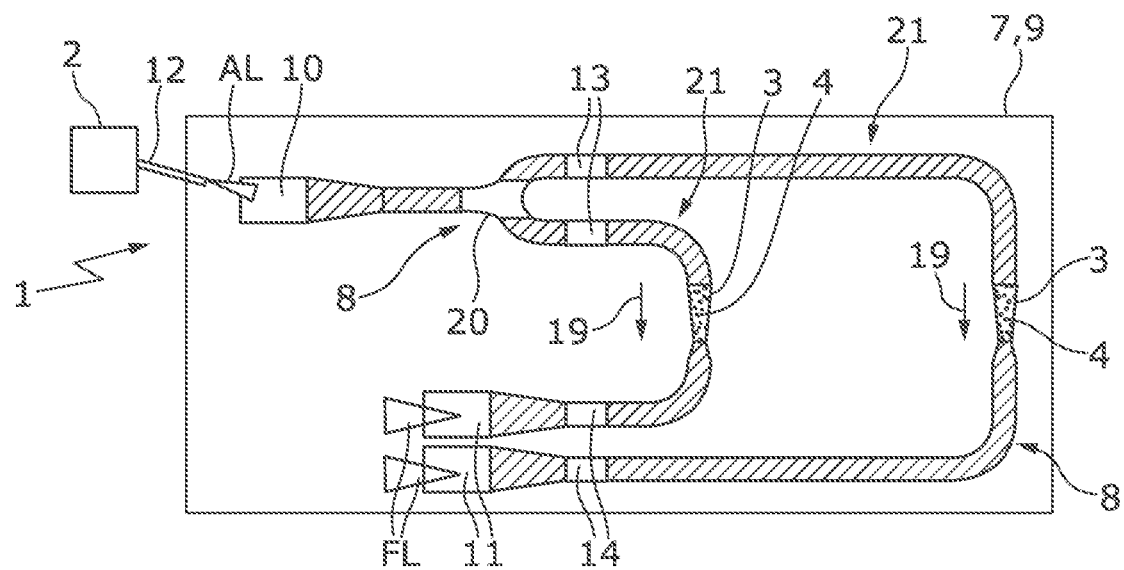
FIG. 2 shows a schematic representation of a variant of the magnetic field gradiometer shown in FIG. 1, in which a beam splitter is used to split excitation light onto two waveguide arms, in each of which one of the measuring waveguides is arranged, according to some embodiments.

FIG. 2 shows a further example of a magnetic field gradiometer 1 similar to that shown in FIG. 1. In comparison to FIG. 1, an illustration of the detectors 5 and the evaluation device 6 was omitted for the sake of simplicity.

In contrast to FIG. 1, the magnetic field gradiometer 1 shown in FIG. 2 only has one excitation light source 2, one optical fiber 12, and one incoupling device 10. The further waveguide structures 8 have a beam splitter 20 for splitting the excitation light AL onto two waveguide arms 21, wherein one of the measuring waveguides 3 is arranged in each case in each of the waveguide arms 21.

Alternatively, the further waveguide structures 8 can also have a beam splitter for splitting the excitation light AL onto three waveguide arms, wherein one of the measuring waveguides 3 is arranged in each case in two of the waveguide arms and a third detector is used for detecting the excitation light AL from the third waveguide arm. The excitation light AL detected by the third detector is used as a laser reference signal, using which additional balancing of the gradiometer signal can be carried out.

FIGS. 3a-d illustrate the manufacturing of a measuring waveguide 3 and further waveguide structures 8 from a diamond crystal 7 in a detail which shows the surroundings of the measuring waveguide 3. As can be seen in FIGS. 3a-d, the measuring waveguide 3 is a freestanding measuring waveguide 3, so that the combined structure made up of the measuring waveguide 3 and the further waveguide structures 8 is not planar. The further waveguide structures 8 are spaced apart in the example shown in FIG. 3c in the area of the measuring waveguide 3 from the remaining diamond crystal 7 and are attached to the diamond crystal 7 at two areas not shown in FIG. 3c.

Figures 3A, 3C:
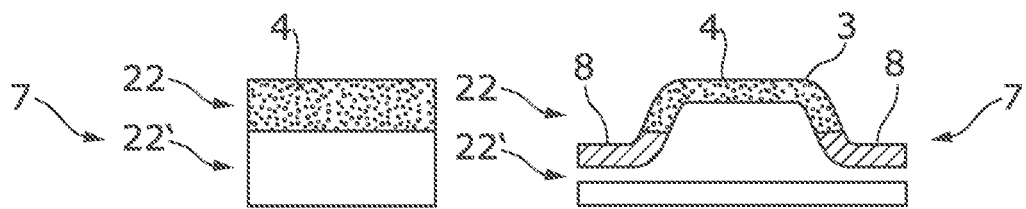
FIGS. 3a-d show schematic representations of a diamond crystal having a first layer doped with NV centers and a second layer not doped with NV centers, and a measuring waveguide manufactured therefrom and further waveguide structures in the surroundings of the measuring waveguide, according to some embodiments.
Figures 3B, 3D:
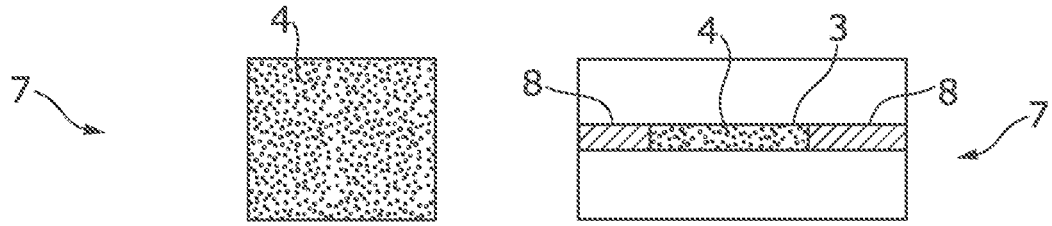

FIGS. 3a and 3c show side views, FIGS. 3b and 3d show top views. In FIGS. 3a and 3b, the diamond crystal 7 is shown after its production and before manufacturing of the measuring waveguide 3 and the further waveguide structures 8. In FIGS. 3c and 3d, the manufacturing of the measuring waveguide 3 and the further waveguide structures 8 is completed.

The diamond crystal 7 comprises a first layer 22 and a second layer 22', wherein the diamond crystal 7 is doped with the NV centers 4 in the first layer 22 and the freestanding measuring waveguide 33 is arranged in the first layer 22, and wherein the second layer 22' is not doped with NV centers 4 and the further waveguide structures 8 are arranged in the second layer 22'.

Corresponding doping can be carried out, for example, during the growth of the diamond crystal 7. The manufacturing of the freestanding measuring waveguide 3 is then preferably carried out by means of a direct writing laser ablation method in a following processing step in which initially a measuring waveguide 3 is formed, which is underetched in a following isotropic etching step, in order to form the freestanding measuring waveguide 3. Parts of the diamond crystal 7 which are not removed are used as the substrate.

In the illustrated example, the first doped layer 22 is arranged above the second, non-doped layer 22'. Notwithstanding this, the first layer 22 can also be arranged below the second layer 22', however.

Figure 4:
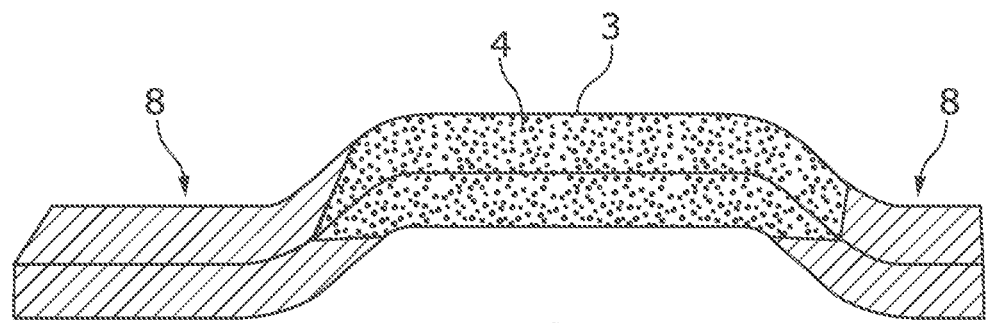
FIG. 4 shows a perspective representation of the measuring waveguide shown in FIGS. 3a-d and the further waveguide structures in the surroundings of the measuring waveguide also shown in FIGS. 3a-d, according to some embodiments.

FIG. 4 shows a perspective representation of the measuring waveguide shown in FIG. 3a-d and the further waveguide structures 8 in the surroundings of the measuring waveguide 3.

Figure 5:
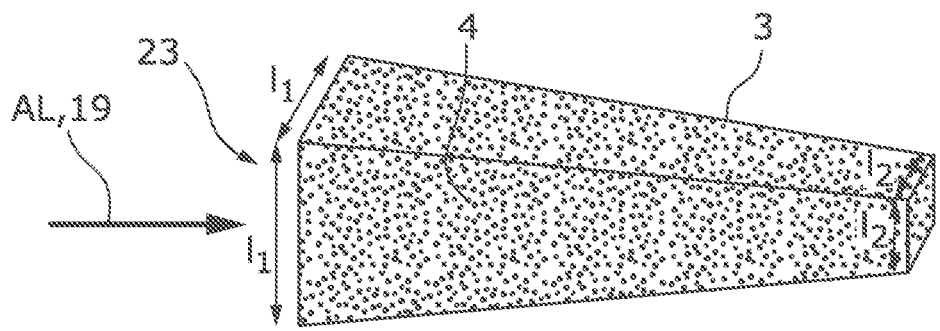
FIG. 5 shows a schematic representation of a measuring waveguide tapering in the propagation direction of the excitation light, according to some embodiments.

FIG. 5 schematically shows one of the measuring waveguides 3 from FIG. 1 in detail. The measuring waveguide 3 tapers in the propagation direction 19 of the excitation light AL. More precisely, for example, it has the shape of a truncated pyramid having square footprint 23. The edge length $l_1$ of the square footprint 23 of the truncated pyramid, which is closer to the excitation light source 2 in the beam path of the excitation light AL, is greater here than the edge length $l_2$ on the side facing toward the detector 5. As described in more detail hereinafter, the edge lengths $l_1$, $l_2$ are selected so that the optical excitation density of the excitation light AL remains constant in the longitudinal direction of the measuring waveguide 3.

Figure 6:
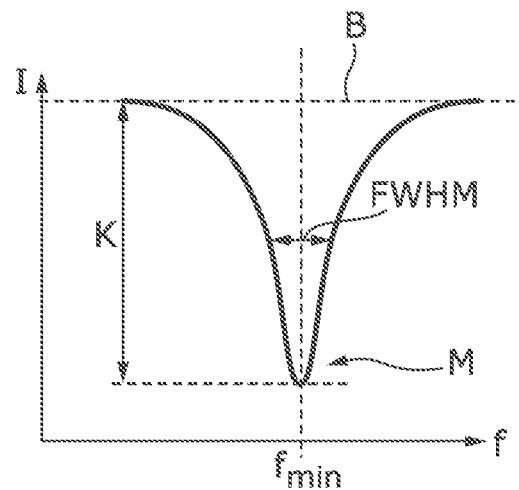
FIG. 6 shows the dependency of the intensity of the fluorescent light from one of the measuring waveguides on the frequency of a microwave field, according to some embodiments.

FIG. 6 schematically shows the dependence of the intensity l of the fluorescent light FL from one of the measuring waveguides 3 of the above-described magnetic field gradiometer 1 or a corresponding magnetometer on the frequency f of the microwave field radiated in. As a result of a magnetic resonance, the intensity l of the fluorescent light has a minimum M in relation to a background value B. The magnetic field in the respective measuring waveguide 3 is determinable here from the frequency $f_{min}$ of the minimum M. The essential parameters comprise the fluorescence contrast K and the full width at half maximum FWHM of the magnetic resonance. The photon shot noise-limited sensitivity, i.e., the smallest measurable magnetic field $B_{min}$, results from the formula $$B_{min} = NF \cdot \frac{FWHM}{\gamma} \cdot \frac{1}{K \cdot \sqrt{R \cdot \tau}},$$

where $\gamma$ is the gyromagnetic ratio, R is the photon rate of the fluorescent light FL, and $\tau$ is the integration time. Furthermore, NF is a numeric factor which is dependent on the mathematical description of the resonance curve. If a Gaussian distribution is assumed, this is approximately 1. In the case of NV centers, the following applies for the gyromagnetic ratio $\gamma \approx 28$ GHz/T.

A possible design of the measuring waveguides 3 is discussed by way of example hereinafter. The following are to be mentioned as boundary conditions for the design of the measuring waveguides 3. In particular an excitation power density of 1 kW/cm² is suitable for an optimum fluorescence contrast. Furthermore, the concentration of the NV centers 4 in the measuring waveguides 3 is preferably to be between 0.1 ppm and 2 ppm, preferably 0.5 ppm.

Under the mentioned boundary conditions, a full width at half maximum FWHM=100 kHz and a fluorescence contrast K=2% are possible, from which with NF≈1, a sensitivity of $$\frac{B_{min}}{\sqrt{Hz}} = \frac{100 \text{ kHz}}{28 \frac{GHz}{T}} \cdot \frac{1}{0.02 \cdot \sqrt{R}} = 179 \cdot 10^{-6} \frac{1}{\sqrt{R}}$$

results.

A sensitivity to be achieved of $$\frac{B_{min}}{\sqrt{Hz}} = 1 \text{ pT}/\sqrt{Hz},$$

corresponding to a photon rate to be detected of $$R = 3.2 \cdot 10^{16} \frac{1}{s},$$

is now assumed. It an outcoupling efficiency from the further waveguide structures 8 into the detector 5 of 85% and a quantum efficiency of the detector of 95% are assumed, the excitation light power to be absorbed thus results at a wavelength of the excitation light of 532 nm (corresponding to a photon energy of approximately 2.33 eV) as $$P_{abs} = 3.2 \cdot 10^{16} \frac{1}{s} \cdot 1.6 \cdot 10^{-19} \frac{As}{e} \cdot 2.33 \text{ eV} \cdot 1/0.8 = 15 \text{ mW}.$$

To avoid field inhomogeneities along the measuring waveguide 3, it is advantageous if it is not longer than 1 mm. At a concentration of the NV centers 4 in the measuring waveguide 3 of 0.5 ppm, an absorption of 20% results along a 1 mm long measuring waveguide 3 (40% at 1 ppm).

At 20% absorption, the coupled-in excitation light power would have to be 75 mW (37.5 mW at 40% absorption and 1 ppm concentration of the NV centers). From the requirement that the optical excitation density is to be 1 kW/cm², with a square waveguide cross-section of the measuring waveguide 3 (i.e., in contrast to what is shown in FIG. 5, the following applies: $l_1=l_2$), an edge length of $$l_1 = l_2 = \sqrt{\frac{75 \text{ mW}}{1 \text{ kW/cm}^2}} = 86 \text{ }\mu m,$$

or a cross-sectional area of $75 \cdot 10^{-6}$ cm² therefore results.
(With 40% absorption and 1 ppm concentration of the NV centers, accordingly $l_1=l_2=61$ Inn and a cross-sectional area of $37.5 \cdot 10^{-6}$ cm².)

As indicated above, a constant optical excitation density can be achieved via a tapering of the measuring waveguide 3. An absorption of 20% along the measuring waveguide 3 corresponds to a reduction of the cross-sectional area from the beginning of the doped measuring waveguide 3 to the end by 20%. In the calculation example, this would correspond to a reduction of the cross-sectional area from $75 \cdot 10^{-6}$ cm² to $60 \cdot 10^{-6}$ cm² or, with a square cross-sectional area, to a reduction of the edge length from $l_1=86$ µm to $l_2=77$ µm.

Figure 7:
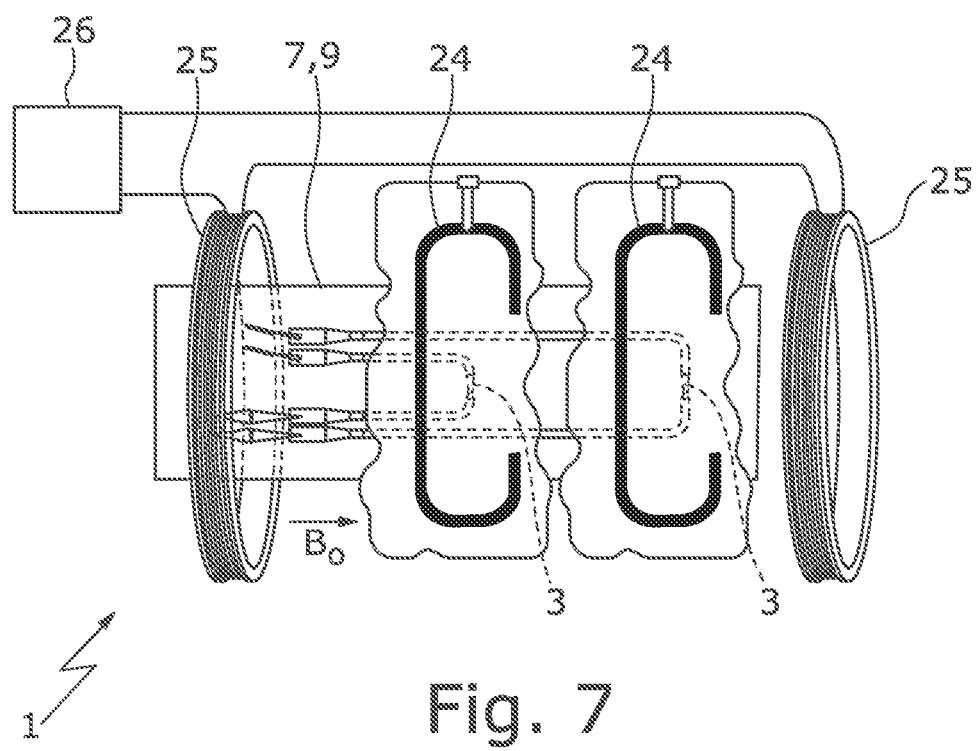
FIG. 7 shows a schematic representation of a variant of the magnetic field gradiometer shown in FIG. 1 having two microwave emitters in the form of split-ring resonators and a magnetic field source in the form of a Helmholtz coil pair, according to some embodiments.

FIG. 7 shows a magnetic field gradiometer 1 similar to that shown in FIG. 1. In contrast to FIG. 1, two microwave emitters 24 in the form of split-ring resonators are shown here, however, other microwave emitters 24 can also be used. The number of microwave emitters 24 can also deviate from two. The microwave emitters 24 are used to apply identical microwave fields to the measuring waveguides 3.

Furthermore, a magnetic field source 25 for applying a bias magnetic field $B_0$ to the measuring waveguides 3 is shown in FIG. 7. The bias magnetic field $B_0$, which has at least approximately the same absolute value and the same direction in both measuring waveguides 3, enables a magnetic field vector measurement. The illustrated magnetic field source 25 is in the form of two current-conducting Helmholtz coils spaced apart from one another, wherein a current source 26 is used to provide the electric current. In contrast to the illustration here, however, other magnetic field sources 25 can also be used, for example permanent magnet arrangements, for example of the Halbach type.

Figure 8A:
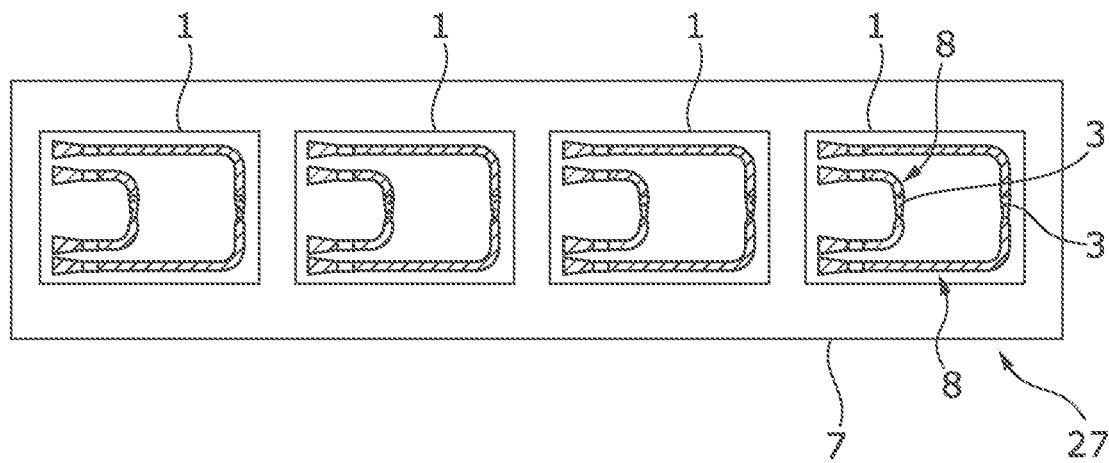
FIGS. 8a, b show schematic representations of magnetic field gradiometer arrays having a plurality of magnetic field gradiometers, according to some embodiments.
Figure 8B:
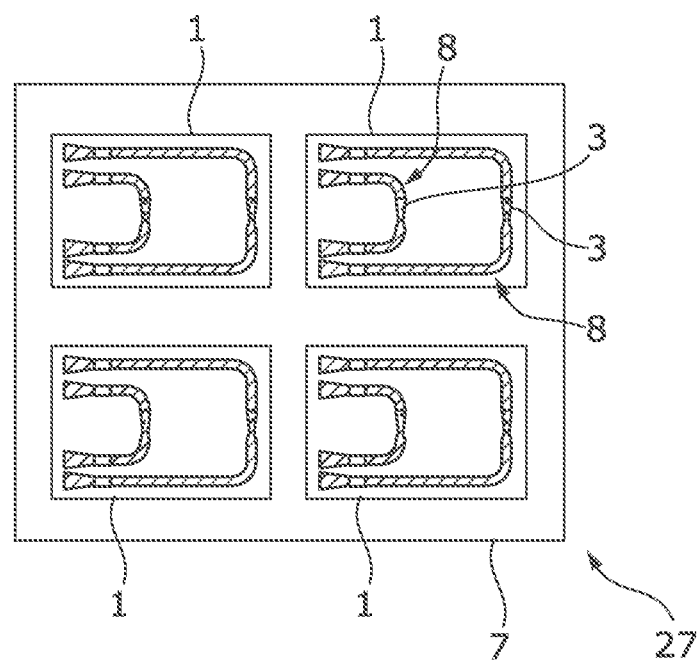

FIGS. 8a and 8b show, by way of example, magnetic field gradiometer arrays 27 comprising a plurality of magnetic field gradiometers 1, which are designed as described above. The measuring waveguides 3 and the further waveguide structures 8 of the magnetic field gradiometers 1 are manufactured in the case shown, but not necessarily, from the same diamond crystal 7, which is additionally used as the substrate.

In FIG. 8a, the magnetic field gradiometers 1 are arranged along an axis, in FIG. 8b, in contrast, they are arranged in a plane. The number of magnetic field gradiometers 1 in the magnetic field gradiometer arrays 27 can deviate from the number shown. A three-dimensional magnetic field gradiometer array (not shown in the figures) is obtained via the stacking of multiple magnetic field gradiometer arrays 27, as are shown in FIG. 8b.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A magnetic field gradiometer for determining a magnetic field gradient, the magnetic field gradiometer comprising:

at least one excitation light source for emitting excitation light, two spatially spaced-apart measuring areas for magnetic field measurement, wherein color centers in diamond are arranged in the two measuring areas, the color centers emit fluorescent light upon excitation using the excitation light, at least one microwave emitter for applying at least one microwave field to the spatially spaced-apart measuring areas, two detectors for detecting the fluorescent light from the two spatially spaced-apart measuring areas, and an evaluator for determining the magnetic field gradient based on the fluorescent light detected by the two detectors, wherein the two measuring areas are configured as freestanding measuring waveguides of a common diamond crystal, wherein the diamond crystal is used as a substrate for the measuring waveguides.

2. The magnetic field gradiometer as claimed in claim 1, wherein the diamond crystal has further waveguide structures, the further waveguide structures being configured to feed the excitation light into the measuring waveguides and to discharge the fluorescent light from the measuring waveguides, wherein the diamond crystal is not doped with color centers in an area of the further waveguide structures.

3. The magnetic field gradiometer as claimed in claim 2, wherein the diamond crystal comprises at least a first layer and at least a second layer, wherein the diamond crystal is doped with the color centers in the first layer and the measuring waveguides are arranged in the first layer, and wherein the second layer is not doped with the color centers, wherein the further waveguide structures are arranged in the second layer.

4. The magnetic field gradiometer as claimed in claim 2, wherein the further waveguide structures have at least one incoupling device for coupling in the excitation light, and at least two outcoupling devices for outcoupling the fluorescent light, wherein the at least one incoupling device and the at least two outcoupling devices are grating couplers or facets.

5. The magnetic field gradiometer as claimed in claim 2, wherein each of the further waveguide structures comprises a short-pass filter configured to transmit the excitation light and reflect the fluorescent light in a beam path before the two measuring waveguides.

6. The magnetic field gradiometer as claimed in claim 2, wherein each of the further waveguide structures comprises a long-pass filter configured to reflect the excitation light and transmit the fluorescent light in a beam path after the two measuring waveguides.

7. The magnetic field gradiometer as claimed in claim 1, wherein a cross section of the measuring waveguides decreases in a propagation direction of the excitation light, wherein a geometry of the measuring waveguides corresponds to a truncated pyramid having a square footprint.

8. The magnetic field gradiometer as claimed in claim 2, wherein the further waveguide structures comprise a beam splitter for splitting the excitation light onto two waveguide arms, wherein each respective measuring waveguide is arranged in a respective waveguide arm.

9. The magnetic field gradiometer as claimed in claim 2, wherein the further waveguide structures comprise a beam splitter for splitting the excitation light onto three waveguide arms, wherein the two measuring waveguides are arranged in a first waveguide arm and a second waveguide arm, respectively, of the three waveguide arms, and a third detector is configured to detect the excitation light from a third waveguide arm of the three waveguide arms.

10. The magnetic field gradiometer as claimed in claim 1, further comprising a magnetic field source for applying a bias magnetic field to the two measuring waveguides, the bias magnetic field having a same direction and a same absolute value in both of the two measuring waveguides.

11. The magnetic field gradiometer as claimed in claim 1, wherein the at least one microwave emitter comprises a split-ring resonator.

12. The magnetic field gradiometer as claimed in claim 1, wherein a concentration of the color centers in the measuring waveguides is between 0.1 ppm and 2 ppm.

13. A magnetic field gradiometer array, comprising a plurality of magnetic field gradiometers as claimed in claim 1, wherein the plurality of magnetic field gradiometers are arranged along an axis or in a plane, wherein the measuring waveguides of the magnetic field gradiometers are manufactured from a common diamond crystal, the diamond crystal being used as the substrate for the measuring waveguides.

14. A three-dimensional magnetic field gradiometer array, comprising a plurality of stacked magnetic field gradiometer arrays as claimed in claim 13.

15. An integrated optical circuit for use in a magnetic field gradiometer as claimed in claim 1, the integrated optical circuit comprising the two spatially spaced-apart measuring areas for magnetic field measurement, the two measuring areas being configured as freestanding measuring waveguides of a common diamond crystal, the diamond crystal being used as the substrate for the measuring waveguides and being doped in the areas of the measuring waveguides with the color centers.

16. The integrated optical circuit as claimed in claim 15, wherein the diamond crystal comprises further waveguide structures, the further waveguide structures being configured to feed the excitation light into the measuring waveguides and to discharge the fluorescent light from the measuring waveguides, wherein the diamond crystal is not doped with color centers in an area of the further waveguide structures.

17. The integrated optical circuit as claimed in claim 16, wherein the diamond crystal comprises at least a first layer and at least a second layer, wherein the diamond crystal is doped with the color centers in the first layer and the measuring waveguides are arranged in the first layer, wherein the second layer is not doped with the color centers, and wherein the further waveguide structures are arranged in the second layer.

18. The integrated optical circuit as claimed in claim 15, wherein a cross section of the measuring waveguides decreases in a propagation direction of the excitation light, wherein a geometry of the measuring waveguides corresponds to a truncated pyramid having a square footprint.

* * * * *